Patented Jan. 22, 1935

1,988,969

UNITED STATES PATENT OFFICE 1,988,969

VITAMIN CONTAINING MATERIAL

Albert F. O. Germann, Cleveland, Ohio, assignor to S. M. A. Corporation, Cleveland, Ohio, a corporation of Ohio No Drawing. Application April 11, 1931, Serial No. 529,541

3 Claims. (Cl. 99—11)

This invention relates to the preparation of vitamin containing materials, and more particularly to a specially prepared oily product or fat containing vitamins A and D. Vitamin D is commonly called the antirachitic vitamin, but vitamin A, it has been found, is equally necessary for growth and general well being of the body, especially for growing children, and is sometimes called the anti-infective vitamin, by reason of its ability to build up the body resistance against infective organisms. Indeed, the absence of vitamin A from the diet and the consequent development of infections is so serious that considerable criticism has been directed to the indiscriminate use of synthetic vitamin D, which contains no vitamin A.

Cod liver oil is the best natural source of both vitamins A and D and until the advent of synthetic vitamin D has been the best means of administering both vitamins, but there is a serious objection to cod liver oil, due not only to its peculiar strong fishy flavor and odor, but also to the fact that some people are unable to tolerate it in any form. This has led, as stated, to the use of synthetic vitamin D, produced in any suitable manner, such as by the application of ultraviolet rays to certain sterols, usually while the latter are in solution in a suitable agent, such as alcohol or ether, the resulting activated product, after evaporation of the vehicle, being administered in a suitable carrier such as oil, for example, corn oil or olive oil. Such methods of preparing and administering vitamin D take no account whatever of vitamin A, with the result that it is entirely omitted, with consequent possible deleterious effects.

The present invention aims to provide a bland or more or less neutral palatable oil or fat which is tolerable by anyone, which does not have the objectionable odor, flavor or taste of cod liver oil and which not only can be made to contain or carry both vitamins A and D, but does so in any desired proportions and with any degree of potency, and in addition, within reasonable limits, may be made to have any desirable chemical or physical characteristics or constants. For example, the oil or fat as to chemical constants, such as the iodine number, saponification number, Reichert Meissl number and melting point, may be made to closely simulate any desired special fat, such as the fat of mother's milk, making it suitable for use in infants' food and otherwise.

I obtain the desired results by the use of any suitable base material, such as a bland, neutral and palatable oil or fat, which is more or less rich in vitamin A and which may be used as the foundation upon which to build up the desired product. This base material may be any oil or fat suitable for the purpose, either vegetable, animal or fish, so long as it is bland and palatable and contains sufficient vitamin A. However, vegetable oils are usually most suitable and convenient, particularly the more liquid oils, for reasons which will appear hereafter. By the use of synthetic vitamin D in connection with such an oil, all objections to the use of synthetic vitamin D are overcome.

Any vegetable oil or other bland or neutral oil containing vitamin A is suitable for the purpose, but palm oil, and particularly yellow palm oil, is especially well adapted for the purpose, because yellow palm oil is rich in vitamin A (See "Further Observations on the Relation of Carotene to Vitamin A" by Bashir Ahmad, Transactions of the Society of Chemical Industry, 50, 12T 1931), and has a very palatable flavor. The yellow palm oil therefore may be used as the base oil by reason of its vitamin A content and other bland or neutral oils (either free from or containing vitamin A) may be added to it for adjustment or modification of the chemical constants, such as iodine number, etc., as above, and vitamin D may be supplied in any suitable manner, either by direct irradiation and consequent change of the sterols in the palm oil to vitamin D, or by the addition of otherwise prepared vitamin D.

For example, yellow palm oil, with a relatively high vitamin A potency, may be mixed with any desired proportions of other bland or neutral fats or oils, such as any or all of coconut oil, peanut oil, cocoa butter, beef or other bland animal fat, to secure a mixture having any desired chemical constants. The mixture may be accomplished by melting the several oils together or in any other suitable manner. This mixture may then be supplied with vitamin D content by any suitable method such as by direct irradiation according to any well known processes, such as the Steenbock or Sperti processes according to their respective Letters Patent Nos. 1,680,818, August 14, 1928, and 1,676,579, July 10, 1928, or, vitamin D may be specially added by mixing with the oils synthetic vitamin D, to wit, ergosterol or "Viosterol" irradiated by either of the said Steenbock or Sperti processes or prepared by any process. This makes it possible to prepare a bland palatable oil rich in both vitamins A and D without the objections to cod liver oil on the one hand or to synthetic vitamin D in an oil carrier and free of vitamin A on the other hand.

The following is an example of the possibilities of the present method. Let it be desired to prepare a vitamin A and D potent fat which has the chemical constants and the melting point of human milk fat, approximately as follows:

| | |
|---|---|
| Iodine number | 40–50 |
| Saponifiable number | 200–215 |
| Reichert Meissl number | 1–3 |
| Melting point | 30°–40° C. |

While not essential, let it be further desired that the fat mixture shall be a vegetable fat mixture containing no animal or fish fats. The following natural and modified fats, commercially available, are instances of many that are suitable for the purpose, their respective chemical constants being as follows:

| | I. No. | R. M. No. | Sap. No. |
|---|---|---|---|
| Palm oil | 50 | 1.5 | 199 |
| Coconut oil | 9 | 7.0 | 260 |
| Peanut oil | 92 | 0.4 | 192 |
| Cocoa butter | 36 | 0.3 | 196 |

Using the above fats, three examples of fat mixtures having approximately the required chemical constants and melting points are as follows:

*Fat mixture No. 1*

| | Part |
|---|---|
| Palm oil | 1 |
| Coconut oil | 1 |
| Peanut oil | 1 |
| Cocoa butter | 1 |

*Fat mixture No. 2*

| | Parts |
|---|---|
| Palm oil | 6 |
| Coconut oil | 2 |
| Peanut oil | 1 |

*Fat mixture No. 3*

| | Parts |
|---|---|
| Palm oil | 9 |
| Coconut oil | 1 |

These fat mixtures have the following chemical constants:

| | I. No. | Sap. No. | R. M. No. | M. P. °C. |
|---|---|---|---|---|
| Fat mixture No. 1 | 47 | 212 | 2.3 | 30 |
| Fat mixture No. 2 | 45 | 212 | 2.5 | 38 |
| Fat mixture No. 3 | 46 | 206 | 2.0 | 40 |
| Human milk fat (average) | 46 | 210 | 2.0 | 35 |

For purposes of ready comparison I have included in the same table the average values of the same chemical constants for human milk fat.

The above mixtures of various proportions of the several bland oils are compounded in any suitable manner, by melting or otherwise, and by reason of their palm oil content they contain substantial proportions of vitamin A. In these mixtures the vitamin D is supplied, as stated, by direct irradiation, the palm oil containing sufficient of the necessary sterols for conversion thereof into vitamin D, or, on the other hand, any desired amount of synthetic vitamin D produced by known processes may be added to the fat mixture. In the case of each of the three fat mixtures described, the resulting product simulates quite closely the chemical constants and melting point of human milk fat and also is potent in both vitamin A and vitamin D and is bland, palatable and unobjectionable to and tolerable by the patient.

Of course, these fat mixtures contain fatty or oily substances which solidify at different temperatures, so that if no account is taken of this phase of the matter, stearine and other fats having a high melting point solidify when the oil is cooled, as during the winter, producing a cloudy appearance. As a result, for medicinal and other purposes, or in any case when a liquid oil which ordinarily will not solidify is desired, my compounded fatty product may be subjected to the usual operation of "cold pressing", for the purpose of removing the more or less solid fats. In other words, a suitable mixture of various vegetable oils or fats, such as a mixture of yellow palm oil, olive oil, corn oil, cottonseed oil, peanut oil, etc., may be melted together or mixed by any method, then chilled to cause separation of the fats having high melting points, after which the chilled oil is filtered through a filter press, or otherwise, to separate the liquid portion from the separated solid portion. Or, the liquid fractions of the several constituents, such as palm oil, olive oil, etc., may be mixed to form a liquid compound. Either method results in a clear liquid which does not become cloudy when allowed to stand for long periods in a cool or cold place. Of course, both the liquid and the solid fat portions of these oils, or mixtures thereof, particularly the yellow palm oil, contain vitamin A, so that according to whether a liquid product, or a more or less pasty, semi-solid or solid product is desirable or necessary, due consideration must be given to the vitamin A content of the ultimate product, and if a higher vitamin A content is desired, more of the yellow palm oil or other vitamin rich bland oil should be used.

Again, yellow palm oil itself contains between 40% and 50% of liquid fats, which may be separated from the solid fats by cold pressing, and the resulting liquid fat has a vitamin A potency substantially the same as that of the original yellow palm oil. Such a liquid yellow palm oil may be used as a base fat and have its chemical constants and melting point adjusted by the addition of other bland liquid fats, such as the vegetable fats, to thereby produce a liquid fat having any desired chemical constants and vitamin A potency, the vitamin D being again supplied by direct irradiation or the addition of synthetic vitamin D, as described.

In any event, it is possible by my method to obtain a bland or neutral and palatable oil tolerable by any patient and having any desirable chemical constants and melting point, and it nevertheless is potent in both vitamins A and D. It is, of course, understood that the term "vitamin A" is intended to include not only vitamin A, but also its precursor, such as carotene.

What I claim is:

1. The method of preparing a bland, palatable liquid fatty product containing both vitamins A and D, consisting in treating yellow palm oil in a manner to separate therefrom those fractions which are permanently liquid when at normal cool temperatures, to thereby provide a permanently liquid base fat containing vitamin A, and treating the same to increase the quantity of vitamin D.

2. The method of preparing a bland, palatable liquid fatty product containing both vitamins A and D, consisting in treating yellow palm oil in a manner to separate therefrom those fractions which are permanently liquid when at normal cool temperatures, to thereby provide a permanently liquid base fat containing vitamin A, and mixing therewith a material containing synthetic vitamin D.

3. The method of preparing a bland, palatable liquid fatty product containing both vitamins A and D, consisting in treating yellow palm oil in a manner to separate therefrom those fractions which are permanently liquid when at normal cool temperatures, to thereby provide a permanently liquid base fat containing vitamin A, mixing therewith liquid vegetable oils of suitable compositions and in proper quantities to secure a liquid fat mixture having any desirable chemical constants, and adding to the mixture a material containing synthetic vitamin D.

ALBERT F. O. GERMANN.

CERTIFICATE OF CORRECTION.

Patent No. 1,988,969. January 22, 1935.

ALBERT F. O. GERMANN.

It is hereby certified that error appears in the printed specification of the above numbered patent requiring correction as follows: Page 2, first column, line 7, for "Saponifiable" read Saponification; and that the said Letters Patent should be read with this correction therein that the same may conform to the record of the case in the Patent Office.

Signed and sealed this 12th day of March, A. D. 1935.

Leslie Frazer (Seal) Acting Commissioner of Patents.